United States Patent
Wolter (10) Patent No.: US 12,518,332 B1
(45) Date of Patent: *Jan. 6, 2026

(54) STORAGE SERVICE FOR SENSITIVE CUSTOMER DATA

(71) Applicant: Block, Inc., Oakland, CA (US)

(72) Inventor: Jonathan Andrew Wolter, San Francisco, CA (US)

(73) Assignee: Block, Inc., Oakland, CA (US)

(*) Notice: Subject to any disclaimer, the term of this patent is extended or adjusted under 35 U.S.C. 154(b) by 134 days.

This patent is subject to a terminal disclaimer.

(21) Appl. No.: 18/315,387

(22) Filed: May 10, 2023

Related U.S. Application Data (63) Continuation of application No. 15/923,804, filed on Mar. 16, 2018, now Pat. No. 11,790,470.

(51) Int. Cl.
| | |
|---|---|
| *H04L 9/40* | (2022.01) |
| *G06F 16/951* | (2019.01) |
| *G06F 40/174* | (2020.01) |
| *G06Q 50/26* | (2012.01) |

(52) U.S. Cl.
CPC ......... *G06Q 50/265* (2013.01); *G06F 16/951* (2019.01); *G06F 40/174* (2020.01); *H04L 63/10* (2013.01)

(58) Field of Classification Search
None
See application file for complete search history.

(56) References Cited

U.S. PATENT DOCUMENTS

| | | | |
|---|---|---|---|
| 9,251,372 B1* | 2/2016 | Lahoz ................. | G06F 21/6245 |
| 10,366,429 B2 | 7/2019 | Isaacson et al. | |
| 10,417,706 B1 | 9/2019 | Simon | |
| 10,482,284 B1* | 11/2019 | Tang ................... | G06F 21/6254 |
| 10,546,292 B1* | 1/2020 | Karaivanov ......... | G06Q 20/401 |
| 10,565,596 B2* | 2/2020 | DeTella .................... | G06F 8/38 |
| 10,853,350 B1* | 12/2020 | Sharifi Mehr ...... | G06F 16/2365 |
| 11,790,470 B1* | 10/2023 | Wolter .................. | G06F 40/174 |
| | | | 726/30 |
| 2004/0054918 A1* | 3/2004 | Duri ..................... | G06Q 20/382 |
| | | | 705/64 |
| 2007/0299735 A1* | 12/2007 | Mangalick ......... | G06Q 30/0633 |
| | | | 705/26.81 |
| 2010/0094755 A1* | 4/2010 | Kloster ................. | G06Q 30/04 |
| | | | 705/44 |
| 2013/0117185 A1* | 5/2013 | Collison ............ | G06Q 20/3829 |
| | | | 705/67 |
| 2013/0198080 A1* | 8/2013 | Anderson ............ | G06Q 20/385 |
| | | | 705/44 |

(Continued)

*Primary Examiner* — Trang T Doan
(74) *Attorney, Agent, or Firm* — Lee & Hayes, P.C.

(57) ABSTRACT

A first inline frame is provided from one or more servers of a service provider for display on a browser executing on a computing device of a first user within a website of a second user. A data retention policy is received from a computing component associated with the second user. Sensitive user data is received via the first inline frame from the computing device of the first user. A token is associated with the sensitive user data. The token is returned to the second user via the computing component. A request is received from the computing component that specifies the token. An electronic payment is initiated responsive to receiving the request, based at least in part on the sensitive user data.

20 Claims, 8 Drawing Sheets

(56) References Cited

U.S. PATENT DOCUMENTS

| | | | | |
|---|---|---|---|---|
| 2014/0032418 A1* | 1/2014 | Weber | ............... | G06Q 20/385 |
| | | | | 705/77 |
| 2014/0108172 A1* | 4/2014 | Weber | ............... | G06Q 30/00 |
| | | | | 705/17 |
| 2015/0073989 A1* | 3/2015 | Green | ............... | G06Q 20/405 |
| | | | | 705/44 |
| 2015/0341322 A1* | 11/2015 | Levi | ............... | G06Q 30/0269 |
| | | | | 726/26 |
| 2018/0007059 A1* | 1/2018 | Innes | ............... | G06F 21/6218 |
| 2018/0191735 A1* | 7/2018 | Lahoz | ............... | H04L 63/102 |
| 2019/0147515 A1* | 5/2019 | Hurley | ............... | G06Q 20/3821 |
| | | | | 705/44 |
| 2019/0197217 A1* | 6/2019 | Donovan | ............... | G06F 11/3476 |
| 2019/0230080 A1* | 7/2019 | Boothby | ............... | H04L 63/0884 |

\* cited by examiner

FIG. 9 ical, and/or ethical obligations. Common examples
STORAGE SERVICE FOR SENSITIVE CUSTOMER DATA

RELATED APPLICATIONS

This application is a continuation of and claims priority to U.S. patent application Ser. No. 15/923,804, filed Mar. 16, 2018, the contents of which are incorporated herein.

BACKGROUND

Merchants frequently operate websites that obtain and use sensitive customer data. Sensitive customer data may include any data that is subject to storage requirements relating to data privacy, security, deletion, and/or access control. These requirements may be imposed by legal, contractual, and/or ethical obligations. Common examples of sensitive customer data include credit card numbers, addresses, medical information, financial information, employment data, social security numbers, and so forth.

A merchant may often need to implement a data retention policy in order to comply with storage requirements such as these. However, determining and complying with data storage requirements may be difficult, and may often be beyond the capabilities of many merchants.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 is a block diagram illustrating an example system for handling sensitive customer data. FIG. 1 illustrates receiving the sensitive customer from a merchant.

FIG. 2 is a block diagram that further illustrates the example system for handling sensitive customer data. FIG. 2 illustrates an example of providing the sensitive customer data, described in FIG. 1, back to a merchant.

FIG. 3 is a block diagram that further illustrates the example system for handling sensitive customer data. FIG. 2 illustrates another example of providing the sensitive customer data, described in FIG. 1, back to a merchant.

FIG. 4 is a block diagram that further illustrates the example system for handling sensitive customer data. FIG. 4 illustrates using the customer sensitive data to perform or initiate a service on behalf of a merchant.

DETAILED DESCRIPTION

In embodiments described herein, a merchant website is configured to avoid local persistent storage of sensitive customer data, and instead, to use a storage service of an online service provider. The storage service has a network-accessible application programming interface (API) that can be accessed by multiple websites to store data. When storing data for a merchant, the storage service implements data retention policies with respect to the stored data. For example, the storage service may encrypt stored data and control access to the stored data. As another example, the storage service may implement backup procedures with respect to the stored data. As yet another example, the storage service may be configured to delete stored data after a data retention period.

In some cases, data retention policies may be specified by the merchant. In other cases, the merchant may indicate the nature of the customer data, and the storage service may use that information to select appropriate retention policies that provide compliance with applicable regulations or other requirements. Data retention policies can be specified per merchant and/or per data item.

In operation, a merchant website obtains sensitive customer data and forwards it to the storage service, using the API of the storage service. In some implementations, the merchant website may obtain sensitive customer data using an inline frame, such as a widget or HTML iframe, that has been provided by the storage service. In these implementations, the inline frame is configured to be displayed within the content of the merchant website, and to solicit and obtain the sensitive customer data while protecting the sensitive customer data from access by the merchant website.

In certain embodiments, the storage service associates each received data item with a token. The token is provided to the merchant as a future reference to the data item. In some cases, a token may refer to multiple data items, and/or to a data object that includes multiple data items. In these cases, each of the multiple data items may also be associated with its own respective token, which may be used for access to individual data items.

After the customer data is stored and a corresponding token is returned to the merchant website, the customer data may be obtained and used by a merchant in various ways, depending the previously specified data retention policies. In some implementations, the merchant website may obtain customer data by specifying the token to the service provider, and after obtaining the data may display it within a page of the website for viewing or modification by a customer, while avoiding any persistent storage of the customer data. Similarly, administrative software used by the merchant, other than the customer-facing merchant website, may obtain customer data by specifying the token to the service provider. The administrative software might use the customer data for various purposes, such as for order picking, shipping procedures, for review by merchant personnel, etc., without persistently storing the customer data.

In some implementations, inline frames, provided by the service provider, may be used to display the customer data to the merchant while preventing access to the customer data by merchant software. For example, patient medical records may be presented to a reviewing health care professional in HTML iframes, so that there is little or no possibility of merchant software accessing the customer data directly.

The described techniques provide a solution to the problem of data retention for merchants who operate websites, which can otherwise be a burden. By allowing the service provider to deal with customer data, the service provider is able to protect the security, privacy, and retention of the customer data, with little or no effort by the merchant. The merchant, however, can still access the data for various uses. This solution is accomplished by gathering and storing the data in ways that protect against certain types of merchant access to the data, as described herein.

Figure 1:
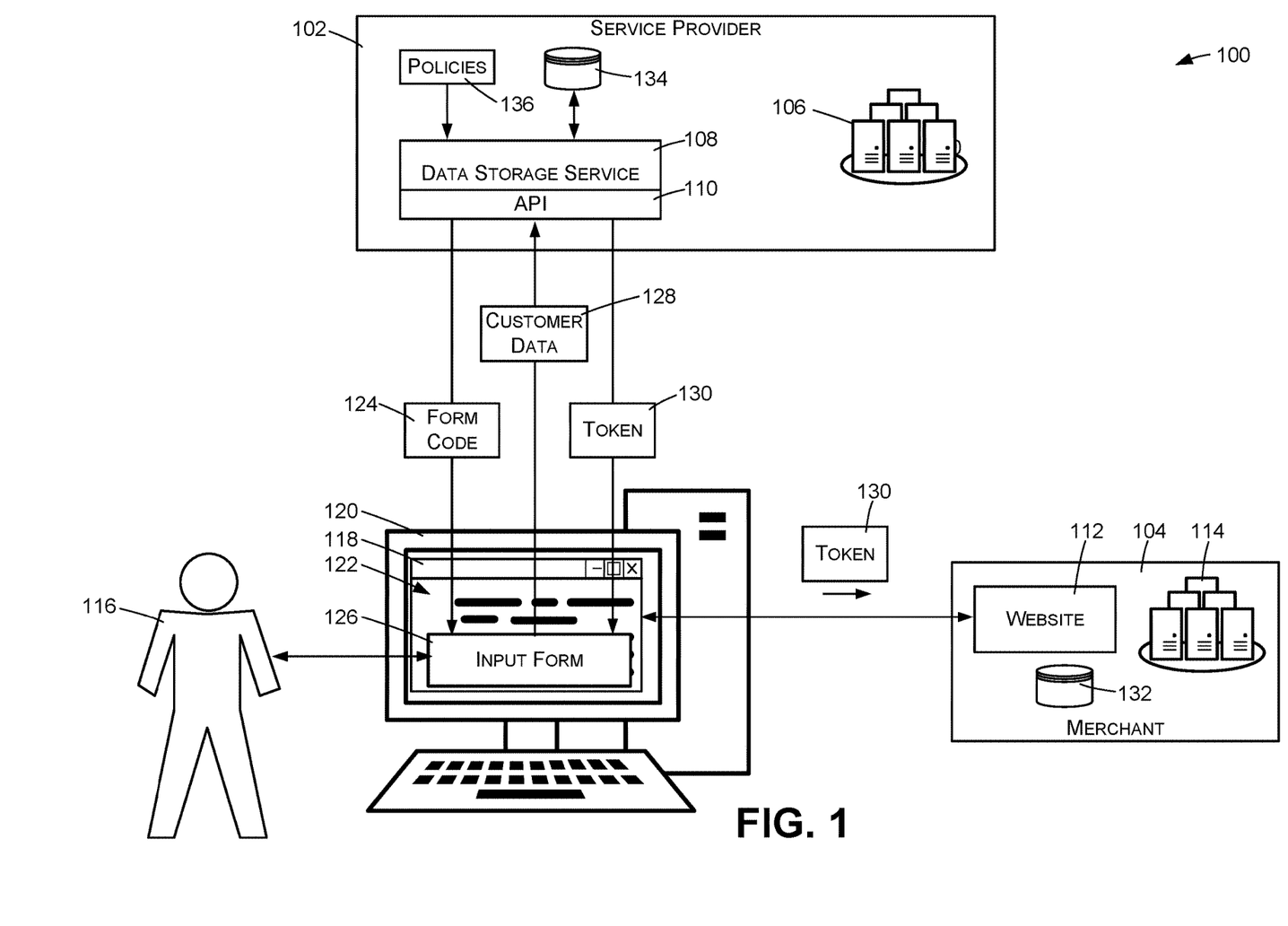

FIG. 1 shows a system 100 illustrating the use by a merchant of a third-party storage service for storing sensitive data regarding a customer or other data provider. In this example, a third-party service provider 102 provides storage services to multiple merchants or other data acquirers, of which a single merchant 104 is shown in FIG. 1. A merchant may be any person, business, business entity or service provider that sells or otherwise provides goods and/or services, as well as any computing components such as software and servers that are provided or controlled by the person, business, business entity or service provider. Merchants may include both buyers and sellers of goods and/or and services.

Sensitive data includes any data that is to be protected from unwarranted disclosure. Examples of sensitive customer data include names, credit card numbers, addresses, contacts, medical information, financial information, employment information, academic information, social security numbers, dates of birth, tax information, user names for use with online accounts, passwords, etc. Sensitive information that could potentially identify a person is sometimes referred to as personal identifying information (PII).

Customers may include buyers and users of goods and services provided by a merchant. For example, a customer may be a purchaser of physical goods from an online retailer. As another example, a customer might be a medical patient or student, and the customer data may represent information such as medical histories and conditions, academic scores, names and addresses, security numbers, and so forth.

The service provider 102 may provide services using one or more servers 106 and other resources that are accessible through a wide-area network, such as the Internet, using an Internet browser and/or using other types of software components. In the illustrated embodiment, the service provider 102 has a data storage service 108 that merchants may use for storing and retrieving sensitive customer data. The data storage service 108 has a network-accessible API 110 that can be accessed for storing data, for retrieving data, and for other purposes.

The merchant 104 has a website 112, referred to herein as a merchant website 112, that is executed by and/or provided from one or more servers 114 associated with the merchant. As an example, the merchant website 112 might implement an online storefront, which is accessible through the Internet or some other network for purchasing offered products.

A website is a collection of web pages that can be accessed through a data communications network such as the Internet, and the software and resources that are used to create, form, manage, serve, and/or implement the web pages and their functionality. A website includes software that runs on one or more servers to support multiple client computer devices. A website also includes software that is provided from the one or more servers for execution within a web browser by a client computer device. For example, executable software such as HTML code and/or JavaScript code may be embedded in web pages that are provided to a client computer device.

A customer 116 of the merchant 104 accesses the merchant website 112 using an HTML hyperlink browser 118 that is executed by a computer device 120. The computer device 120 may comprise a personal computer, a mobile device such as a smartphone, a portable device such as a tablet computer or laptop computer, or any other type of computerized device that provides for user interaction. The browser 118 is used to access documents and functionality provided by the merchant website 112, which may include website content 122 that is displayed at and/or executed by the computer device 120. The website content 122 may include graphical elements that are displayed by the computer device 120 as well as code that is executed within the browser 118 by the computer device 120.

In some cases, a customer might access the merchant website 112, or other components offering similar functionality, using a different type of a client, such as an application other than a browser. In these cases, the application might access an application programming interface (API) of the merchant in order to provide data to the merchant and to receive data from the merchant.

In the illustrated embodiments, the content 122 may relate to products that are being provided or offered for sale by the merchant 104. For example, the merchant website 112 might allow the customer 116 to select items for purchase. In some cases, the merchant website 112 may provide a virtual "shopping cart" that the customer 116 uses to keep track of items that have been selected for purchase.

In order to complete a purchase or other transaction, the merchant website 112 at some point may need to obtain customer data such as a name, an address, and other data. As an example, the customer 116 may enter payment information for a purchase transaction. Payment information may include a payment instrument identifier, such as a credit card or debit card number. Payment information may also include the customer name and address, and any other information that may be needed from the customer 116 in order to process an electronic payment. Any or all of this data may be considered to be sensitive, and therefore subject to data retention requirements.

In the illustrated example, the content 122 of the merchant website 112 includes code that sends a request for an inline input form to the data storage service 108, using the API 110. The data storage service 108 responds by returning input form code 124, again through the API 110. The input form code 124 executes within the browser 118 on the computer device 120 to create an input form 126 within the content 122.

In described embodiments, the input form 126 comprises an inline display component such as an HTML iframe. An HTML iframe allows an independent HTML document, from a third party such as the service provider 102, to be embedded within a parent document, such as a page of the merchant website 112. The parent document includes commands for communicating with the third-party provider and requesting a specified HTML iframe. In response, the third-party provider returns HTML iframe code, and the HTML iframe code is executed to create a graphical pane within the parent document.

An HTML iframe such as this may have fields that accept designated types of data. The HTML iframe may be configured to use style sheets of the parent document, and may therefore be configured to have a look and feel that is appropriate to the website in which it will be displayed. However, the HTML iframe is implemented so that the parent document is not able to access data entered into the fields of the HTML iframe. Rather, the HTML iframe itself provides this data back to the third-party provider.

In the example of FIG. 1, the input form code 124 is rendered and/or executed to produce the data input form 126 within the website content 122. The data input form 126 contains input fields for the customer 116 to enter customer data 128, which is returned by the data input form 126 to the data storage service 108 through the API 110. The data input form 126 is designed to protect the customer data 128 from being accessed by the website 112. More specifically, the data input form 126 protects the customer data 128 from being accessed by any website code that is running within the browser 118, other than the code of the input form 126 itself.

Upon receiving the customer data 128, the data storage service 108 creates a unique token 130, associates the token 130 with the customer data 128, and returns the token 130 to the data input form 126 in a manner such that it can be accessed by the website 112. For example, the token 130 may be stored in a common area of memory so that it can be accessed by the content 122 of the website 112. The website 112 stores the token 130 in non-volatile storage 132 associated with the website 112.

The data storage service 108 stores the customer data 128 in persistent memory 134, such as one or more magnetic-based hard disks. The customer data 128 is maintained in accordance with one or more data retention policies 136. The association between the token 130 and the stored customer data 128 is also stored in the persistent memory 134 for future reference.

The data retention policies 136 may specify various procedures and/or parameters for retaining sensitive data. For example, the data retention policies 136 may specify a retention period, indicating the length of time that the data is to be stored after being received or accessed. The data retention policies 136 may also specify backup procedures, encryption details, access details, etc. In some embodiments, the data retention policies 136 may specify data egress policies, specifying the types of access that are allowed to the stored customer data.

In some cases, the data retention policies 136 may be specified by the merchant 104, at various levels of granularity depending on the implementation. For example, the merchant 104 may specify a single data retention policy that applies to all data of the merchant 104. As another example, the merchant 104 may specify a respective data retention policy for each data item or data object that is submitted for storage by the data storage service 110.

In some cases, the data retention policies 136 may be selected by the data storage service 108. For example, the customer data 128 may be provided along with an indication of its type, such as whether the customer data is a name, an address, a social security number, etc. In this case, the data storage service 108 might be configured to automatically apply an appropriate data retention policy to each different type of data.

After the customer data 128 is stored by the data storage service 108, the website 112 and/or other software applications of the merchant 104 can access or utilize the customer data 128 by providing the corresponding token 130, subject to egress policies and/or other data retention policies.

Figure 2:
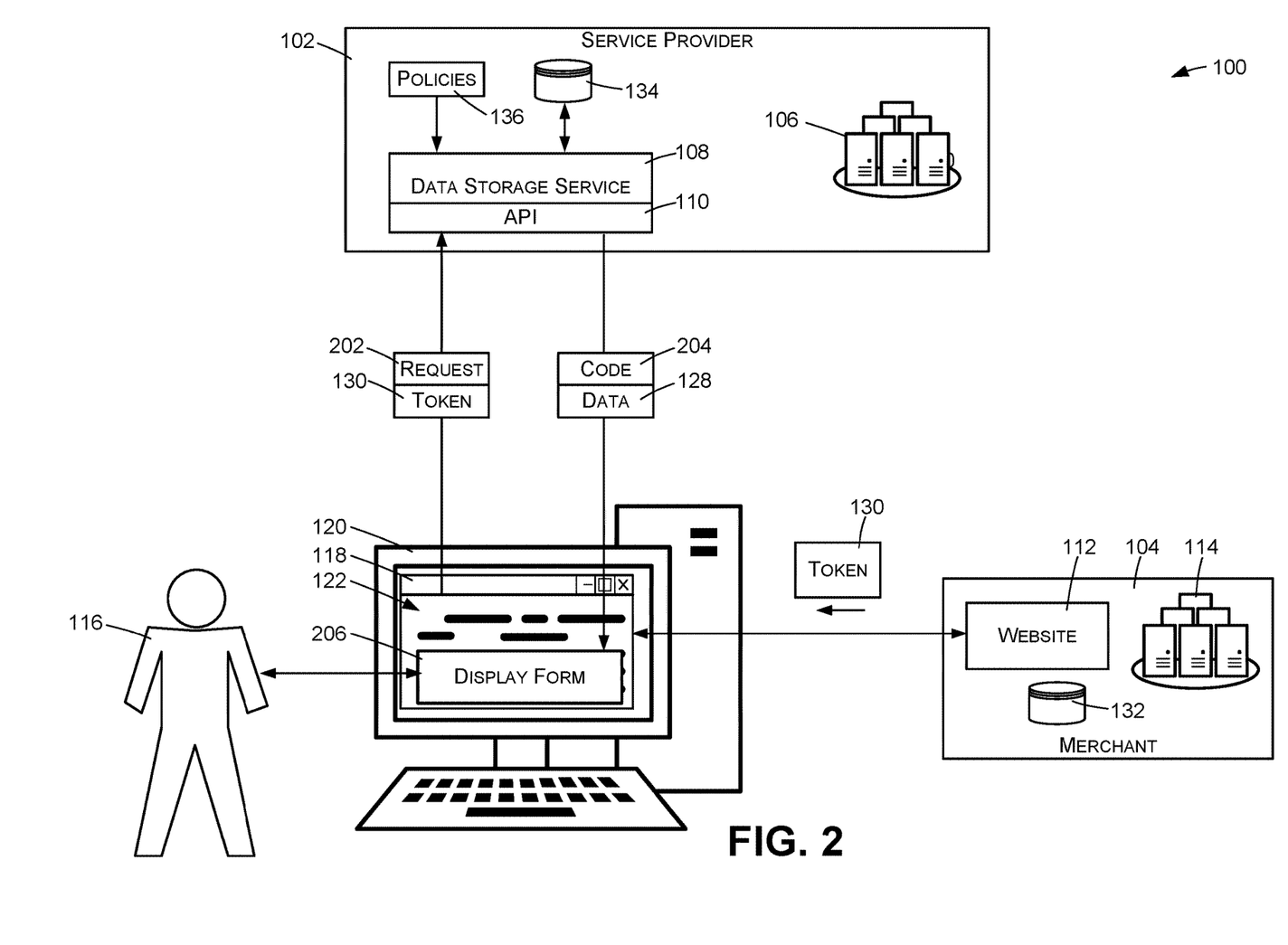

FIG. 2 illustrates an example of how the stored customer data 128 might be utilized, in the environment already described with reference to FIG. 1. In this example, the content 122 of the website 116 is configured to send a request 202 to the data storage service 108 to obtain the previously stored sensitive customer data. The request 202 specifies the token 130.

The data storage service 108 responds by returning display form code 204, along with the customer data 128 corresponding to the provided token 130. The display form code 204 is designed to create and present a display form 206 within the website content 122. The display form 206 is designed to show at least some of the previously stored customer data 128.

The display form 206 may comprise an inline frame or other component such as an HTML iframe as described above, and may be designed to protect the customer data 128 from being accessed by the website content 122 and/or by other software of the website 112.

In some cases, the display form 206 may allow the customer 116 to revise the customer data 128. The display form 206 may be configured to send revised customer data back to the data storage service 108 for storage in place of the originally specified customer data 128. In other cases, the display form 206 might prevent any modification of the displayed data.

The display form 206 may be used to display various groupings of data, not limited to displaying data corresponding to a single token. For example, rather than submitting a single token with the request 202, the website 112 might specify multiple tokens, corresponding to multiple data items, and the display form might allow scrolling through the data items. For example, tokens might correspond respectively to different entries in a chronological listing of financial transactions. If the website 112 were to submit these multiple tokens, the display form might display all of the corresponding entries. In other cases, a single token might correspond to multiple data items, and the display form 206 might be configured to display all of these data items. For example, contact information might be represented as a single data object specifying individual fields such as name, street, city, state, and zip code.

Figure 3:
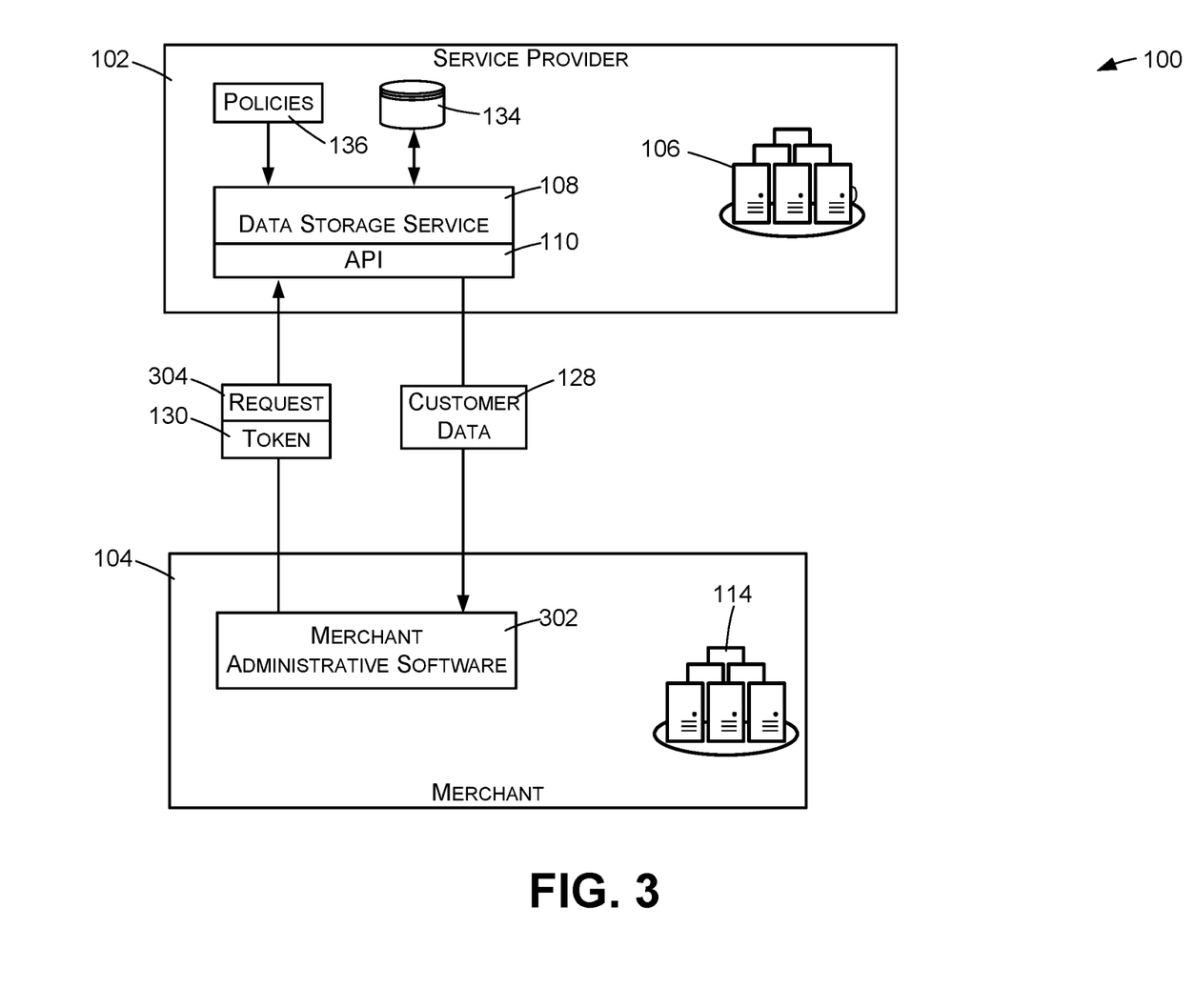

FIG. 3 illustrates another example of how the stored customer data 128 might be accessed and or utilized, in this case by administrative software 302 of the merchant 104, for various functions in support of the merchant's business. The administrative software 302 may comprise an application that runs on a desktop computer or a smartphone, for example. Alternatively, the administrative software 302 might comprise an internal website that is used by the merchant 104 for administrative purposes and business activities.

Administrative software might be used for activities such as order fulfillment, customer support, bookkeeping, billing, inventory management, providing insurance services, providing medical services, managing subscribers, maintaining medical, educational, or employment records, managing or performing provided services, managing work schedules, etc.

The administrative software 302 may be configured to communicate with the data storage service 108 through one or more local-area or wide-area networks, which may include the Internet. More specifically, the administrative software 302 may be configured to use the API 110 of the data storage service 108 to provide a request 304 and the token 130. The data storage service 108 may reply to the request 304 by returning the customer data 128 to the administrative software 302.

In order to protect against the possibility of violating data retention policies, the administrative software 302 may be configured to store the customer data only transitorily, and/or to not save the customer data 128 to non-volatile storage locations such as databases, hard disks, flash memory, etc. In some cases, the administrative software may store the customer data 128 temporarily in non-volatile storage, and delete the customer data immediately after it is used in order to avoid any possibility of violating data retention requirements.

In some cases, the administrative software 302 may comprise an HTML-based application, and the customer data 128 may be displayed in an HTML iframe to the merchant, in accordance with the techniques already described, so that there is less chance that any of the customer data will be accessible to or stored by the administrative software 302.

Figure 4:
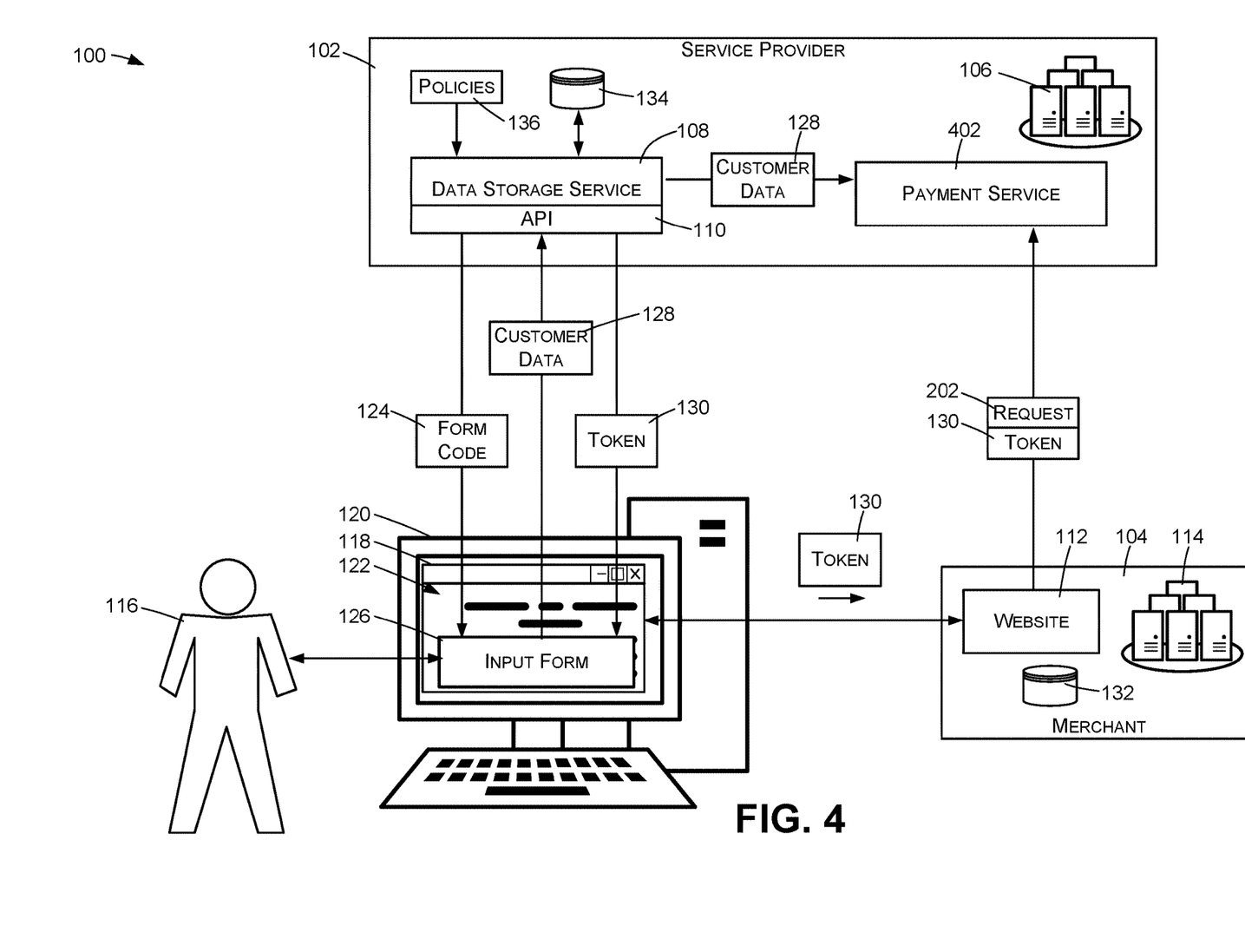

FIG. 4 illustrates yet another example of how the stored customer data 128 might be accessed and or utilized. In this example, the service provider 102 provides what are sometimes referred to as merchant services, used to enable and facilitate payment processing for online sales between merchants and customers. In this example, the service provider 102 provides a payment service 402 in addition to the data storage service 108. The payment service 402 may be used to process credit card payments, debit card payments, mobile payments, and/or different types of electronic payments from customers to merchants. In this example, the payment service 402 works in conjunction with the data storage service 108 of the service provider 102, so that the merchant 104 does not need to directly access or store sensitive customer data.

The merchant website 112 in this example is designed to interact with the customer 116 and to allow the customer 116 to select items that are added to a virtual shopping cart. At some point, as the customer 116 browses the website 112 and selects items, the customer 116 may decide to check out and to provide payment information for the items currently in the virtual shopping cart. The merchant application 112 responds by displaying the content 122, which in this example is used to summarize the proposed purchase transaction and to obtain payment information. The content 122 is designed to obtain the form code 124 from the service provider 102 and to execute the form code 124 to create the input form 126. The input form obtains the customer data 128, which in this example comprises payment information, and provides it to the data storage service 108 of the service provider 102. The data storage service 108 stores the customer data 128, and retains the customer data 128 in accordance with the data retention policies 136 as already described.

At a later time, the website 112 might be used to either finalize the transaction described above or to perform another transaction. In a situation like this, the website application 112 can issue a request 202 to the payment service 402, where the request specifies the token 130 and details regarding a requested payment. The payment service responds by specifying the token 130 to the data storage service 108 in order to retrieve the customer data 128. The payment service 402 then initiates the payment process, using the customer data 128 as payment information.

Techniques such as described with reference to FIG. 4 may be used in various situations in which a third party performs services for the merchant based on sensitive customer data. For example, third-party services such as this might be used for shipping, for drop-shipment orders, for providing medical records, etc. The example of FIG. 4 allows the merchant to utilize third-party services without saving or directly accessing sensitive customer data. In some embodiments, the third-party service and the data storage service may be provided by different providers, and may communicate using a wide-area network.

Customer data may be specified as one or more data objects. An individual data object might correspond to a single data item or to multiple data items. For example, name and address data items (e.g., street, state, zip code) might each be specified by respective data objects, and each data object might be associated with a respective token. Alternatively, a single data object might specify a data structure comprising multiple data items, such as multiple name and address fields, and the data object might have a single associated token. In some implementations, a group of multiple related data items might be associated with a single token, and the individual data items of the group might also each have an associated token.

The API 110 of the data storage service 108 can be implemented to allow different types of functionality. For example, API functions might allow data items to be specified and retrieved individually and/or in groups. In some implementations, the API 110 may have functions allowing merchant software to query using specified criteria to find customers or data items that satisfy the criteria. In some implementations, the API 110 may have functions allowing for verification. For example, a merchant might obtain a first token for a data item, at a later time obtain a second token for a new data item, and then use the API 110 to determine whether the first and second tokens specify the same data.

Figure 5:
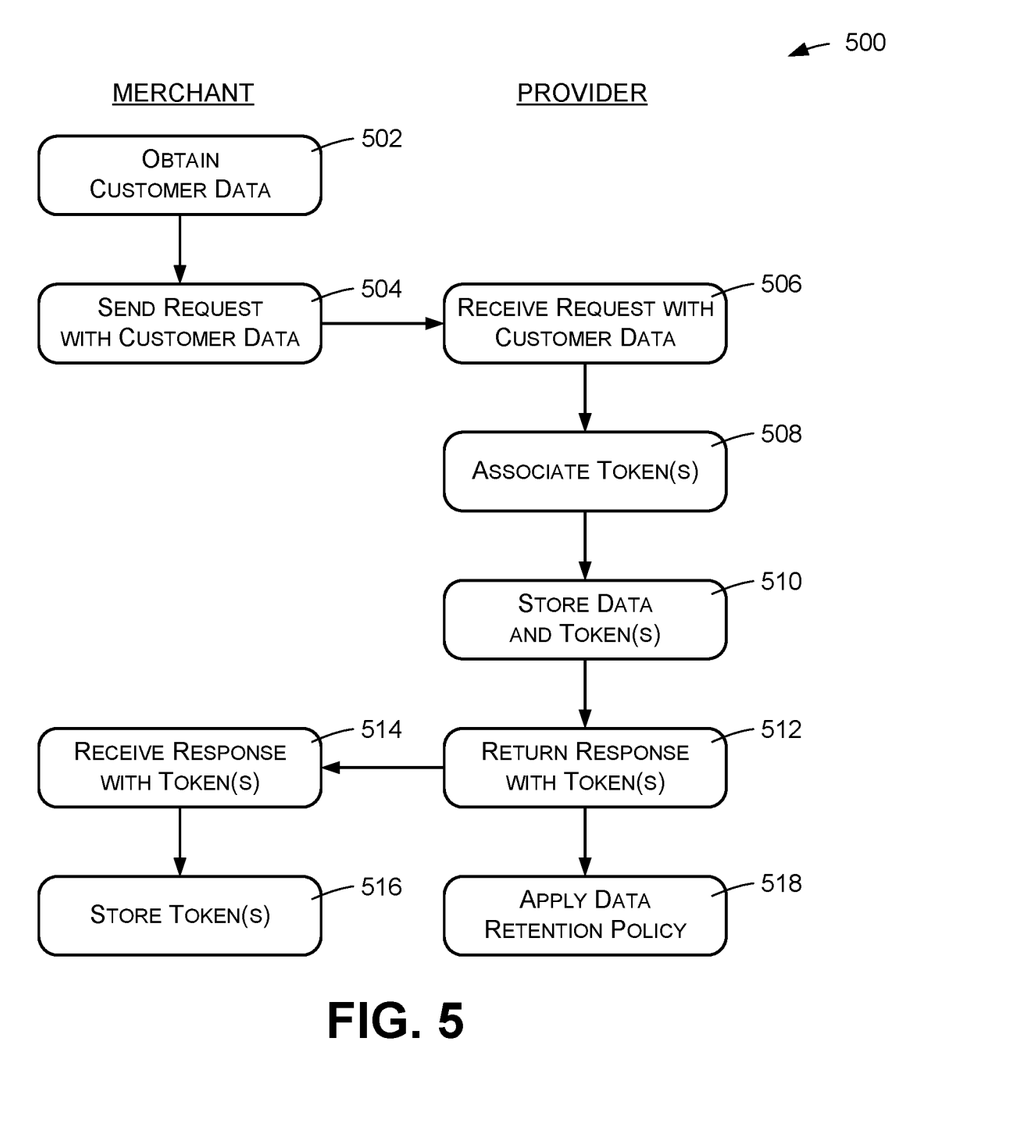
FIG. 5 is a flow diagram illustrating an example method for storing sensitive customer data.

FIG. 5 illustrates an example method 500 of managing sensitive data, such as sensitive customer data provided by a customer at a website of a merchant. The left side of FIG. 5 shows actions that may be performed by a merchant. More specifically, these actions may be performed by one or more computing components of the merchant, such as computers, servers, and/or software of the merchant. In the environment described above, the actions on the left side of FIG. 5 are performed by the website of the merchant.

The actions on the right side of FIG. 5 may be performed by a service provider, such as the service provider 102 of FIGS. 1-4. More specifically, these actions may be performed by network-accessible computers, computer servers or other computing devices of the service provider. The service provider may be a provider of services for multiple merchants, including merchants who are located in various geographic locations. The service provider may in some cases provide services in addition to data storage services. For example, the service provider may provide services such as payment transaction support, employee management and scheduling, sales support, medical practice management, legal practice management, and so forth.

An action 502, performed by the merchant, comprises obtaining information from a customer, which may include sensitive data regarding the customer. As an example, the information may be obtained through a website operated by the merchant for selling goods and/or services. In some embodiments, the action 502 may be performed by an independent code component such as an HTML iframe that has been obtained from the service provider. For example, the merchant website may include code that calls the service provider to obtain an HTML iframe and that then displays the iframe within a page of the website. The HTML iframe in this embodiment is configured to obtain the customer data independently of the merchant website, and to report the data back to the service provider as described herein.

An action 504 comprises sending a request to the service provider, where the request contains a data object specifying customer data, including sensitive customer data. A data object may specify one or multiple data items, in accordance with a data structure and/or protocol that has been agreed upon between the merchant and the service provider. Alternatively, a data object may correspond to an individual data item, and multiple data items may be sent to the provider in separate requests. As yet another alternative, a single request to the provider may specify multiple data objects, each of which will receive a corresponding token. The following discussion will assume that each request has a single data object, which in turn may specify one or multiple data items.

The action 504 may be performed, for example, by communicating with the service provider over a wide-area network, through one or more APIs of the service provider. In some embodiments, the action 504 may be performed by an HTML iframe as described above, which has been obtained from the service provider and displayed within the merchant website.

In some embodiments, the request may also specify one or more data retention policies that are to be applied to the one or more data objects of the request. Data retention policies may also be specified in separate communications with the service provider. Alternatively, in some embodiments the merchant may specify data retention policies in other ways, such as through a service agreement with the service provider or through setup procedures prior to saving data.

In some embodiments, the actions 502 and 504 may be performed without persistently storing the sensitive customer data. That is, while sensitive customer data may be stored briefly within random-access memory (RAM) and/or other volatile memory of the merchant, the sensitive customer data is treated as transient data by the merchant, and is not stored in non-volatile memory such as hard disks or flash memory that is used by merchant servers. By not persistently storing the customer data, other than at the service provider, the merchant can avoid the need for implementing local data retention policies. Data retention policies may instead be implemented by the service provider.

An action 506, performed by the service provider, comprises receiving the request and the specified data object. The action 506 may include receiving the one or more data retention policies from the merchant.

An action 508, performed in response to receiving the data object, comprises associating a token with the data object, to be used in the future as a reference to the data object. In some cases, particularly where the data object comprises a data structure having multiple data items, the action 508 may comprise associating a token with each of the data items.

An action 510 comprises storing the data object and its associated token or tokens. For example, the data object and tokens may be stored in non-volatile memory of the service provider, such as a hard disk. In some embodiments, the objects and tokens may be stored in a database maintained by the service provider for this purpose. The data object is stored in accordance with a specified data retention policy, as will be described below in reference to an action 518.

An action 512 comprises returning the tokens to the merchant via the computing component of the merchant, as a reference to the data object and/or to the data items of the data object. For example, the action 512 may comprise returning a response to the merchant, where the response specifies the tokens. An action 514, by the merchant, comprises receiving the response and the specified tokens. An action 516, by the merchant, comprises storing the tokens for future reference to the data object that has been stored by the service provider. The tokens may be stored persistently, in non-volatile memory of the merchant.

After returning the response to the merchant in the action 512, the service provider performs an action 518 of applying a data retention policy to the stored data object. The data retention policy may be a policy that was specified in the request from the merchant, or may be determined by the service provider in accordance with a policy that has been specified for all data objects or for the data objects received from a particular merchant. As an example, the data retention policy may specify a data retention period, and the action 518 may include removing the data object after the data retention period has expired. Data retention policies may specify methods of encrypting the sensitive data, conditions for granting access to the sensitive data, methodologies for backing up the sensitive data, etc.

The method 500 may be performed multiple times to receive multiple data objects from multiple merchants, wherein each of the data objects represents sensitive data regarding a respective customer of a respective merchant. Appropriate authentication and encryption may be used for communications between the merchant website and the service provider.

Figure 6:
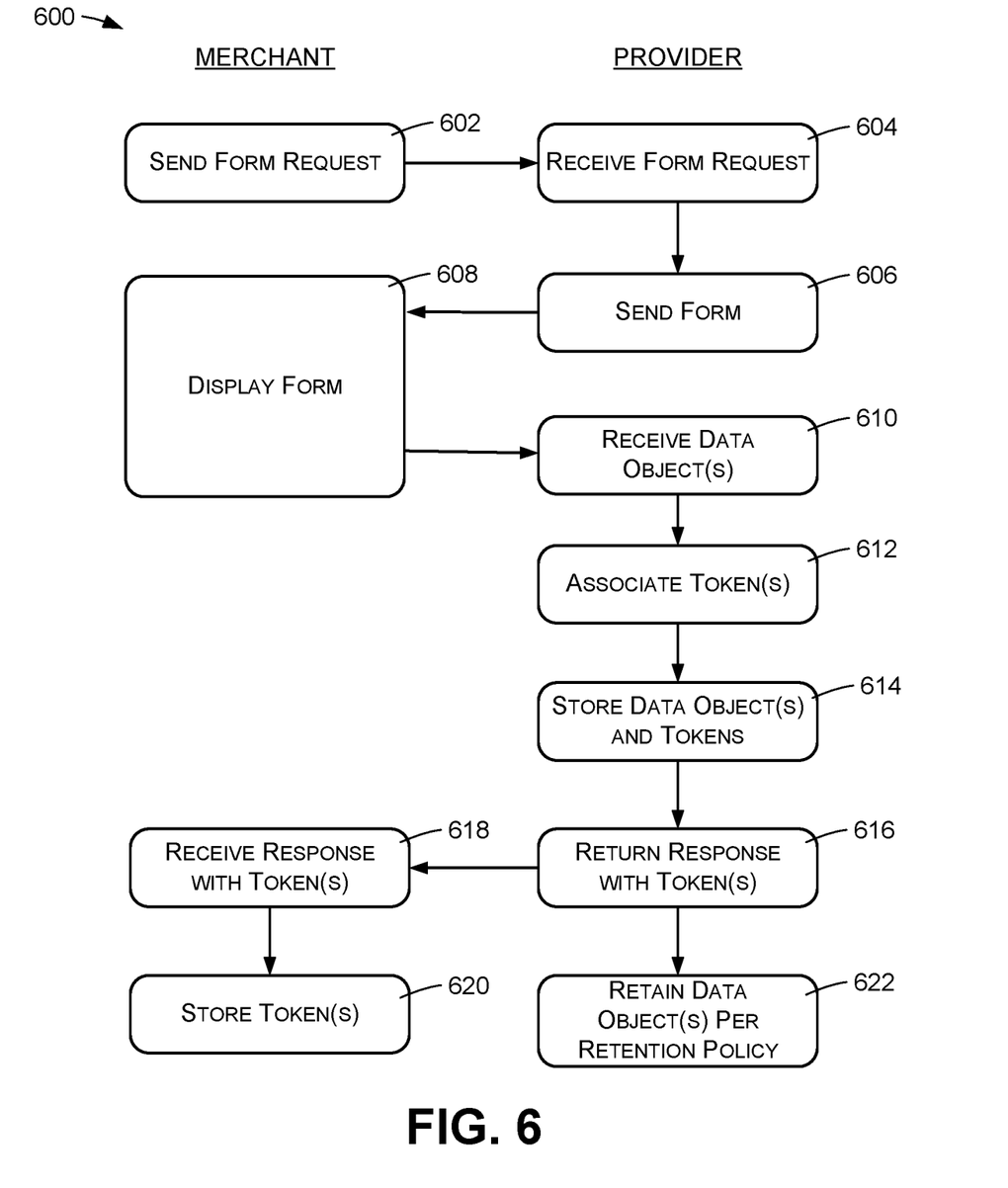
FIG. 6 is a flow diagram illustrating another example method for storing sensitive customer data.

FIG. 6 illustrates an example method 600 of managing sensitive data, such as sensitive customer data provided by a customer at a website of a merchant. As in FIG. 5, the left side of FIG. 6 shows actions performed by a merchant, such as by a website of a merchant. The right side of FIG. 6 illustrates actions performed by one or more network-accessible computer servers of a service provider. The method 600 is performed when the customer navigates to a page of the merchant website.

An action 602, performed by the merchant, comprises sending a form request. In certain embodiments, the action 602 is performed by a page of the merchant website that is being displayed on a customer's browser. For example, the form request may comprise an HTML iframe request. An action 604, performed by the provider, comprises receiving the request.

An action 606, performed in response to receiving the form request, comprises providing an inline display component for display within the displayed page of the merchant website. As described above, the inline display component may comprise an HTML iframe that is configured to (a) obtain sensitive data from the customer, (b) provide the sensitive data to the one or more computer servers of the service provider, and (c) protect the sensitive data from being accessed and/or persistently stored by the merchant website.

An action 608, performed by the merchant website, comprises receiving and displaying the inline display component. An action 610, performed the service provider, comprises receiving one or more data objects obtained by the inline display component and sent back to the service provider. As described above, each data object may comprise sensitive customer data in the form of one or more data items.

An action 612, performed in response to receiving the data objects via the inline form, comprises associating a token with each data object, to be used in the future as a reference to the data object.

An action 614 comprises storing the data objects and associated tokens. For example, the data and tokens may be stored in non-volatile memory of the service provider, such as a hard disk. In some embodiments, the data objects and tokens may be stored in a database maintained by the service provider for this purpose.

An action 616 comprises providing the tokens to the merchant website as references to the sensitive data. In certain embodiments, the action 616 may comprise returning a response to the merchant, where the response specifies the tokens.

An action 618, by the merchant, comprises receiving the response and the specified tokens. An action 620, by the merchant, comprises storing the tokens for future reference to the data object that has been stored by the service provider. The tokens may be stored persistently, in nonvolatile storage associated with the merchant.

After returning the response to the merchant in the action 616, the service provider performs an action 622 of retaining the sensitive data in a database of the service provider in accordance with a data retention policy. In this example, the data retention policy may be a policy that has been previously agreed upon between the merchant and the service provider, or that has been specified as being standard policy by the service provider.

In some embodiments, the data retention policy may specify a data retention period, indicating a period of time after which the sensitive data is to be deleted. The action 622 may include removing the sensitive data from the database of the service provider after the data retention period, in accordance with the data retention policy. Data retention policies may specify methods of encrypting the sensitive data, conditions for granting access to the sensitive data, methodologies for backing up the sensitive data, etc.

Figure 7:
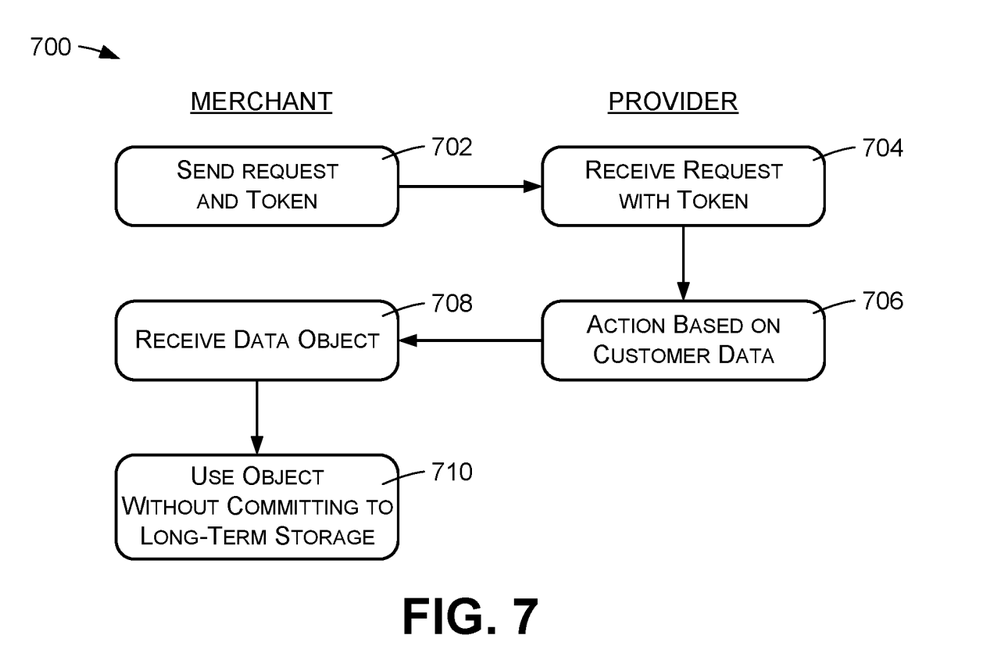
FIG. 7 is a flow diagram illustrating an example method for providing sensitive customer data to a merchant.

FIG. 7 illustrates an example method 700 of using customer data that has been stored in accordance with the techniques described above. The left side of FIG. 7 shows actions performed by a merchant. More specifically, these actions may be performed by merchant software such as a website or administrative software. Administrative software, for example, may run on one or more computing devices of the merchant and may be used for administrative purposes such as account review, help desk, auditing, shipping, etc. In some cases, the administrative software may comprise HTML code that runs within a browser of the merchant.

The right side of FIG. 7 illustrates actions performed by a service provider.

An action 702, performed by the merchant, comprises sending a data request to the service provider, where the data request specifies one or more tokens that have been previously received from the service provider as references to one or more data objects.

An action 704, performed by the service provider, comprises receiving the data request and the one or more tokens. An action 706, performed by the service provider in response to receiving the data request and tokens, comprises taking an action based that is based at least in part on customer data specified by data objects that have been previously associated with the tokens.

The action 706 may in some cases comprise returning the customer data to a computing component, such as to a computing component of the merchant. In other cases, however, the action 706 may comprise returning an inline display component such as an HTML iframe to the merchant, and displaying the customer data in the inline display component in a way that protects the customer data from being accessed or stored by merchant software. In yet other embodiments, the action 706 may comprise performing or initiating an action or service for the requesting merchant, such as initiating an electronic payment.

In the example method 700, it is assumed that the action 706 comprises providing the data object to the computing component of the merchant. An action 708, performed by the computing device of the merchant, comprises receiving the data object. An action 710 comprises using the data object in some way without committing the data object or its data items to any form of long-term storage. For example, the computing device of the merchant may be configured to display the data item of the data object, to print the data item of the data object, to use the data item to initiate an action such as an electronic payment, etc.

Figure 8:
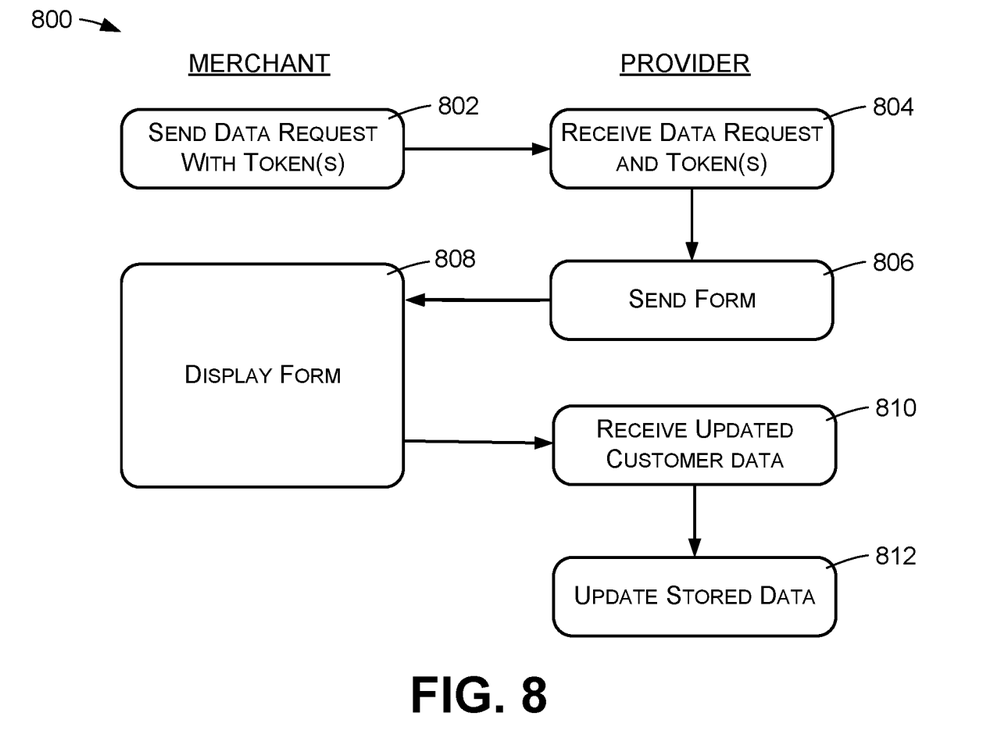
FIG. 8 is a flow diagram illustrating another example method for providing sensitive customer data to a merchant.

FIG. 8 illustrates an example method 800 of providing sensitive customer data for use within a merchant website. The left side of FIG. 8 shows actions performed by a merchant, such as a merchant website. The right side of FIG. 8 illustrates actions performed by a service provider.

An action 802, performed by the merchant website, comprises sending a data request, where the data request specifies one or more tokens that have been previously received from the service provider. An action 804, performed by the service provider, comprises receiving the request and tokens.

An action 806, performed in response to receiving the request, comprises providing an inline display component for display within a merchant application or website, in a manner such that the data object is viewable by a customer or the merchant, but is not persistently stored by the merchant. The merchant application or website receives the display component and performs an action 808 of displaying the inline display component. The display component is configured to display the customer data specified by the data object, while protecting the customer data from being accessed or persistently stored by the merchant. In some cases, the inline display component may comprise an HTML iframe as described above.

In some cases, the display component may be designed to allow a customer to revise the customer data. In this case, the display component returns the revised data to the service provider. The service provider receives the revised data in an action 810. The service provider then performs an action 812 of updating the stored customer data.

Figure 9:
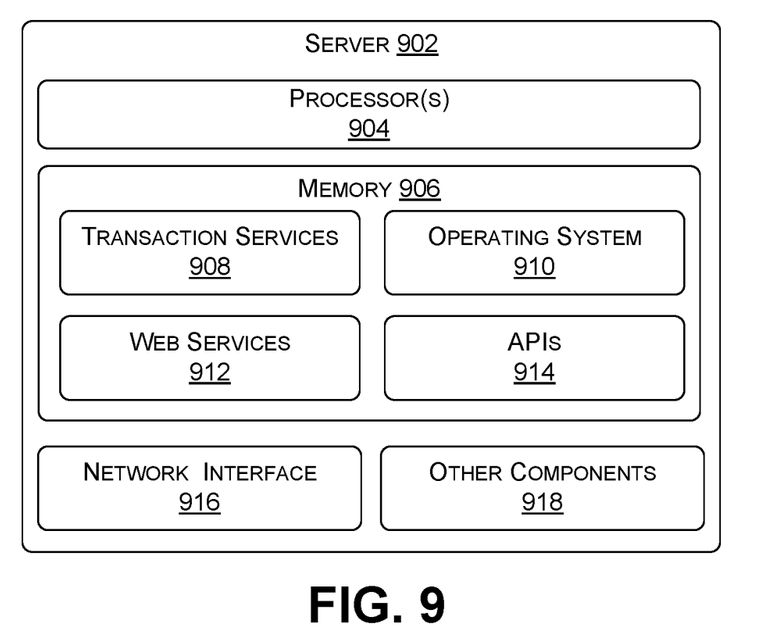
FIG. 9 is a block diagram of an example server that may be used by a service provider to implement the techniques described herein.

FIG. 9 shows an example of a computing device 902, one or more of which may be used to implement the functionality of various components discussed above. For example, the functionality of the service provider 102, including the data storage service 108 and the payment service 402, may be implemented by a plurality of computing devices 902, configured as servers. The computing devices 902 may be programmed or otherwise configured to perform the actions that are attributed herein to the payment service provider 102. One or more computing devices 902 such as shown in FIG. 9 may similarly be used to implement functions of the merchant 104. The computer device 120 may also comprise a device such as the computing device 902.

Generally, the computing device 902 may comprise a general purpose or specialized computer, such as a desktop computer or rack-mounted computer. In the illustrated example, the computing device 902 includes at least one processor 904 and associated memory 906. Each processor 904 may itself comprise one or more processors or processing cores. For example, the processor 904 can be implemented as one or more microprocessors, microcomputers, microcontrollers, digital signal processors, central processing units, state machines, logic circuitries, and/or any devices that manipulate signals based on operational instructions. In some cases, the processor 904 may be one or more hardware processors and/or logic circuits of any suitable type specifically programmed or configured to execute the algorithms and processes described herein. The processor 904 can be configured to fetch and execute computer-readable processor-executable instructions stored in the memory 906.

Depending on the configuration of the computing device 902, the memory 906 may comprise tangible non-transitory computer-readable storage media and may include volatile and nonvolatile memory and/or removable and non-removable media implemented in any type of technology for storage of information such as computer-readable processor-executable instructions, data structures, program modules or other data. The memory 906 may include, but is not limited to, RAM, ROM, EEPROM, flash memory, solid-state storage, magnetic disk storage, optical storage, and/or other computer-readable media technology. Further, in some cases, the computing device 902 may access external storage, such as RAID storage systems, storage arrays, network attached storage, storage area networks, cloud storage, or any other medium that can be used to store information and that can be accessed by the processor 904 directly or through another computing device or network. Accordingly, the memory 906 may be computer-readable storage media able to store instructions, modules or components that may be executed by the processor 904. Further, when mentioned, non-transitory computer-readable media exclude media such as energy, carrier signals, electromagnetic waves, and signals per se.

The memory 906 may be used to store and maintain any number of functional components that are executable by the processor 904. The functional components may include transaction services 908, for example, for supporting various types of merchant services. Generally, functional components comprise instructions or programs that are executable by the processor 904 and that, when executed, implement operational logic for performing the actions and services attributed above to the data storage service 108, the payment service 402, the merchant 104, or the computer device 120.

Additional functional components may include an operating system 910 and a web services component 912. The memory 906 may also store APIs (application programming interfaces) 914 that are used for communications between the computing device 502 and other network-accessible entities. The memory 906 may also store data, data structures and the like, that are used by the functional components.

The computing device 902 may have a network communications interface 916, such as an Ethernet communications interface, which provides communication by the computing device 902 with other servers, with the Internet, with POS devices and/or other peripherals or terminals, etc.

The computing device 902 may of course include many other logical, programmatic, and physical components 918 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more computing devices, comprising:
   one or more processors; and
   one or more non-transitory computer-readable media storing computer-executable instructions that, when executed, cause the one or more processors to perform actions comprising:
   providing, from one or more servers of a service provider, a first inline frame for display on a browser executing on a computing device of a first user within a website of a second user;
   receiving, via the first inline frame and from the computing device of the first user, first user data obtained by the first inline frame, wherein the first user data comprises sensitive data associated with the first user and wherein the first inline frame provides access to the first user data by the service provider and prevents access to the first user data by the website of the second user;
   receiving, from a computing component associated with the second user, a data retention policy for the first user data from, wherein the data retention policy is specified by the second user;
   in response to receiving the first user data via the first inline frame, associating a token with the first user data, wherein the token is a reference to the first user data;
   returning the token to the second user via the computing component such that the token can be used as a future reference to the first user data;
   receiving a request from the computing component, wherein the request specifies the token; and
   responsive at least in part to receiving the request, initiating an electronic payment by the first user that is based at least in part on the first user data.

2. The one or more computing devices of claim 1, wherein the request further specifies virtual cart information, and wherein the electronic payment is further based at least in part on the virtual cart information.

3. The one or more computing devices of claim 1, wherein the first user data comprises payment information associated with the first user, wherein the payment information comprises one or more of a payment instrument identifier, a name of the first user, an address of the first user, or an account identifier of a financial account of the first user.

4. The one or more computing devices of claim 3, wherein the request comprises a first request, and wherein initiating the electronic payment comprises:
   sending, by a payment processing component of the service provider to a data storage component of the service provider, the token and a second request for the payment information;
   receiving, by the payment processing component and from the data storage component, the payment information; and
   processing, by the payment processing component, the electronic payment based at least in part on the payment information and transaction data received from the second user.

5. The one or more computing devices of claim 1, wherein initiating the electronic payment comprises processing a credit card payment or a debit card payment to the second user.

6. The one or more computing devices of claim 1, the actions further comprising:
   causing presentation of at least a portion of the first user data via a display associated with the computing component.

7. The one or more computing devices of claim 1, the actions further comprising one or more of:
   storing the first user data in a database associated with the service provider in accordance with the data retention policy; or
   deleting the first user data from the database in accordance with the data retention policy.

8. The one or more computing devices of claim 1, wherein the request comprises a first request, and the actions further comprising:
   returning the token to the first user via the computing device of the first user as a reference to the first user data;

receiving a second request from the computing device of the first user, wherein the second request specifies the token;

causing presentation of at least a portion of the first user data via a display associated with the computing device of the first user via a second inline frame; and receiving, via the second inline frame and from the computing device of the first user, an indication of an update to the first user data.

9. The one or more computing devices of claim 1, wherein the service provider provides data storage services and payment processing services to a plurality of merchants, wherein the second user is one of the plurality of merchants.

10. A method comprising:

providing, from one or more servers of a service provider, a first inline frame for display on a browser executing on a computing device of a first user within a website of a second user;

receiving, via the first inline frame and from the computing device of the first user, first user data obtained by the first inline frame, wherein the first user data comprises sensitive data associated with the first user and wherein access to the first user data by the website of the second user is prevented by the first inline frame;

receiving, from a computing component associated with the second user, a data retention policy for the first user data, wherein the data retention policy is specified by the second user;

in response to receiving the first user data via the first inline frame, associating a token with the first user data, wherein the token is a reference to the first user data;

returning the token to the second user via the computing component such that the token can be used as a future refence to the first user data;

receiving a request from the computing component, wherein the request specifies the token; and responsive at least in part to receiving the request, initiating an electronic payment by the first user that is based at least in part on the first user data.

11. The method of claim 10, wherein the request further specifies virtual cart information, and wherein the electronic payment is further based at least in part on the virtual cart information.

12. The method of claim 10, wherein the first user data comprises payment information associated with the first user, wherein the payment information comprises one or more of a payment instrument identifier, a name of the first user, an address of the first user, or an account identifier of a financial account of the first user.

13. The method of claim 12, wherein the request comprises a first request, and wherein initiating the electronic payment comprises:

sending, by a payment processing component of the service provider to a data storage component of the service provider, the token, and a second request for the payment information;

receiving, by the payment processing component and from the data storage component, the payment information; and processing, by the payment processing component, the electronic payment based at least in part on the payment information and transaction data received from the second user.

14. The method of claim 10, further comprising:

storing the first user data in a database associated with the service provider in accordance with the data retention policy; or deleting the first user data from the database in accordance with the data retention policy.

15. The method of claim 10, wherein initiating the electronic payment comprises processing a credit card payment or a debit card payment to the second user.

16. The method of claim 10, wherein the service provider provides data storage services and payment processing services to a plurality of merchants, wherein the second user is one of the plurality of merchants.

17. A system comprising:

one or more processors; and one or more non-transitory computer-readable media storing instructions executable by the one or more processors, wherein the instructions cause the one or more processors to perform acts comprising:

providing, from one or more servers of a service provider, a first inline frame for display on a browser executing on a computing device of a first user within a website of a second user;

receiving, via the first inline frame and from the computing device of the first user, first user data obtained by the first inline frame, wherein the first user data comprises sensitive data associated with the first user and wherein the first inline frame prevents access to the first user data by the website of the second user;

receiving, from a computing component associated with the second user, a data retention policy for the first user data, wherein the data retention policy is specified by the second user;

in response to receiving the first user data via the first inline frame, associating a token with the first user data, wherein the token is a reference to the first user data;

returning the token to the second user via the computing component such that the token can be used as a future reference to the first user data;

receiving a request from the computing component, wherein the request specifies the token; and responsive at least in part to receiving the request, initiating an electronic payment by the first user that is based at least in part on the first user data.

18. The system of claim 17, wherein the request further specifies virtual cart information, and wherein the electronic payment is further based at least in part on the virtual cart information.

19. The system of claim 17, wherein the first user data comprises payment information associated with the first user, wherein the payment information comprises one or more of a payment instrument identifier, a name of the first user, an address of the first user, or an account identifier of a financial account of the first user.

20. The system of claim 19, wherein the request comprises a first request, and wherein initiating the electronic payment comprises:

sending, by a payment processing component of the service provider to a data storage component of the service provider, the token, and a second request for the payment information;

receiving, by the payment processing component and from the data storage component, the payment information; and processing by the payment processing component, the electronic payment based at least in part on the payment information and transaction data received from the second user.

* * * * *